(12) United States Patent
Raajaratnam et al.

(10) Patent No.: US 9,667,671 B2
(45) Date of Patent: May 30, 2017

(54) METHOD AND SYSTEM FOR FACILITATING COMMUNICATION BETWEEN MESSAGE CONSUMERS AND MESSAGE PRODUCERS

(71) Applicant: Xerox Corporation, Norwalk, CT (US)

(72) Inventors: Preethi Raj Raajaratnam, Tamil Nadu (IN); Selvakumar Periasamy, Chennai (IN); Arun Bakthavachalu, Webster, NY (US); Hua Liu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 271 days.

(21) Appl. No.: 13/892,628

(22) Filed: May 13, 2013

(65) Prior Publication Data
US 2014/0337537 A1  Nov. 13, 2014

(51) Int. Cl.
*H04L 29/06* (2006.01)
*H04L 29/08* (2006.01)
*H04L 12/58* (2006.01)

(52) U.S. Cl.
CPC ...... *H04L 65/1069* (2013.01); *H04L 67/1008* (2013.01); *H04L 67/141* (2013.01); *H04L 51/14* (2013.01)

(58) Field of Classification Search
CPC ....... H04L 65/1069; G06F 9/46; G06F 15/173
See application file for complete search history.

(56) References Cited

U.S. PATENT DOCUMENTS

| | | | |
|---|---|---|---|
| 6,915,519 B2 | 7/2005 | Williamson et al. | |
| 7,698,398 B1* | 4/2010 | Lai | 709/223 |
| 2005/0256931 A1* | 11/2005 | Follmeg et al. | 709/206 |
| 2008/0120072 A1* | 5/2008 | Bartz | G06F 17/30693 705/310 |
| 2008/0297305 A1* | 12/2008 | Little | 340/5.1 |
| 2009/0019124 A1* | 1/2009 | Reynolds et al. | 709/206 |
| 2009/0031422 A1* | 1/2009 | Aaron | H04L 63/0263 726/23 |
| 2010/0333111 A1* | 12/2010 | Kothamasu et al. | 719/313 |
| 2011/0258262 A1* | 10/2011 | Bezdicek et al. | 709/206 |

* cited by examiner

*Primary Examiner* — Nicholas Taylor
*Assistant Examiner* — Sanjoy Roy
(74) *Attorney, Agent, or Firm* — Jones Robb, PLLC

(57) ABSTRACT

A method and system for facilitating communication between message producers and message consumers is disclosed. When a message producer is interested in identifying a message consumer for processing generated messages, the message producer declares a consumer identification rule. A messaging service manager identifies a set of suitable message consumers by comparing the consumer identification rule with a set of attributes associated with each of the message consumers registered with the messaging service manager and assigns channels associated with the set of identified message consumers to the message producer. The message producer may select a channel associated with a message consumer to initiate communication between the message producer and the message consumer.

21 Claims, 9 Drawing Sheets

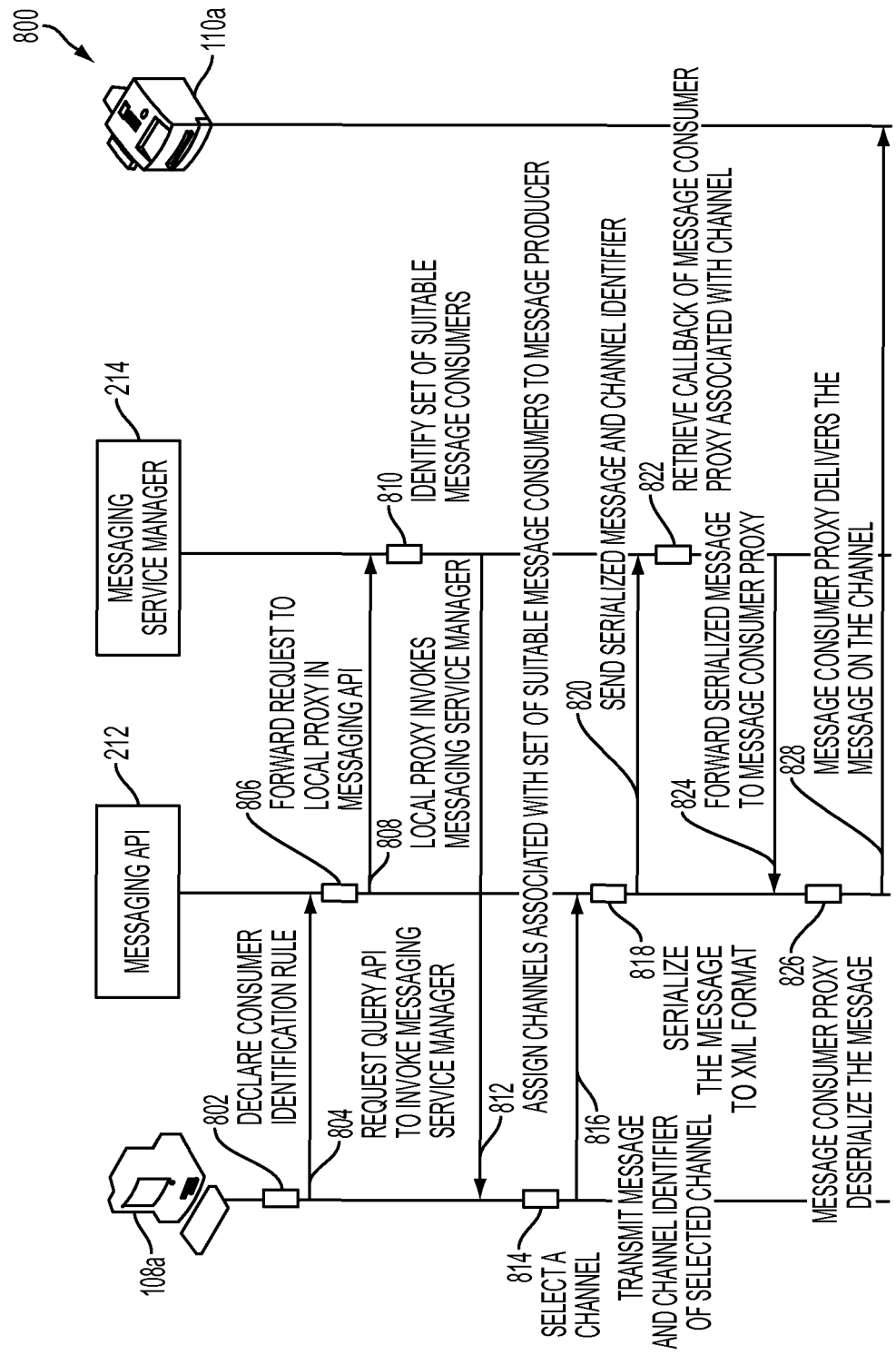

METHOD AND SYSTEM FOR FACILITATING COMMUNICATION BETWEEN MESSAGE CONSUMERS AND MESSAGE PRODUCERS

TECHNICAL FIELD

The presently disclosed embodiments relate to messaging frameworks. More particularly, the presently disclosed embodiments relate to methods and systems for facilitating communication between message producers and message consumers.

BACKGROUND

The messaging systems enable an entity capable of generating messages (hereinafter referred to as a message producer) to communicate with a remote entity capable of processing the generated messages (hereinafter referred to as a message consumer) through a common channel. In certain messaging systems, the message producer and the message consumer refer to a common channel using a channel identifier. Naming services, such as Java Naming and Directory Interface (JNDI) ensure the unique identification of channels across the messaging systems. However, these services cannot validate if the message producer and message consumer registered on the channel are compatible with each other.

Certain messaging systems use enterprise service bus (ESB) that provides a centralized message bus through which all messages between various entities flow. The ESB may be implemented in messaging systems when all the messaging entities (e.g., message producers/originators and message consumers/receivers) in the system have been developed/configured beforehand and are ready for sending and receiving messages. This limits evolution of the distributed systems because it prevents addition and deletion of the messaging entities or introduction of new message types, after the messaging system has been set up.

Further, in a distributed/dynamic application environment, there may be more than one message consumers available for the message producer. In such cases, though the message producer has multiple potential message consumers, the existing messaging systems do not allow the message producer to validate the most appropriate message consumer.

SUMMARY

According to embodiments illustrated herein, there is provided a method for facilitating communication between message consumers and message producers. The method comprises receiving a consumer identification rule from a message producer. Thereafter, a first set of message consumers from the message consumers are identified based on the consumer identification rule and a set of attributes associated with each of the message consumers. A channel associated with at least one message consumer from the first set of message consumers is then assigned to the message producer and communication between the message producer and the at least one message consumer is initiated on the assigned channel.

According to embodiments illustrated herein, there is provided a system for facilitating communication between message consumers and message producers. The system comprises a messaging API, a messaging service manager, and a communication manager. The messaging API is configured for receiving a consumer identification rule from a message producer. The messaging service manager is configured for identifying a first set of message consumers from the message consumers based on the consumer identification rule and a set of attributes associated with each of the message consumers. The messaging service manager is further configured for assigning a channel associated with the at least one message consumer from the first set of message consumers to the message producer. The communication manager is configured for initiating communication between the message producer and the at least one message consumer through the assigned channel.

According to embodiments illustrated herein, there is provided a computer program product for use with a computer. The computer program product comprises a computer-readable medium storing a computer-readable program code embodied therein for facilitating communication between message consumers and message producers. The computer-readable program code comprises program instruction means for receiving a consumer identification rule from a message producer. The computer-readable program code also comprises program instruction means for identifying a first set of message consumers from the message consumers based on the consumer identification rule and a set of attributes associated with each of the message consumers. The computer-readable program code further comprises assigning a channel associated with at least one message consumer from the first set of message consumers to the message producer and initiating communication between the message producer and the at least one message consumer on the assigned channel.

BRIEF DESCRIPTION OF DRAWINGS

The accompanying drawings illustrate various embodiments of systems, methods, and/or other aspects of the invention. Any person having ordinary skills in the art will appreciate that the illustrated element boundaries (such as boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which:

FIG. 8 is a message flow diagram illustrating flow of messages between the various components of the system environment in accordance with at least one embodiment.

DETAILED DESCRIPTION

Figure 1:
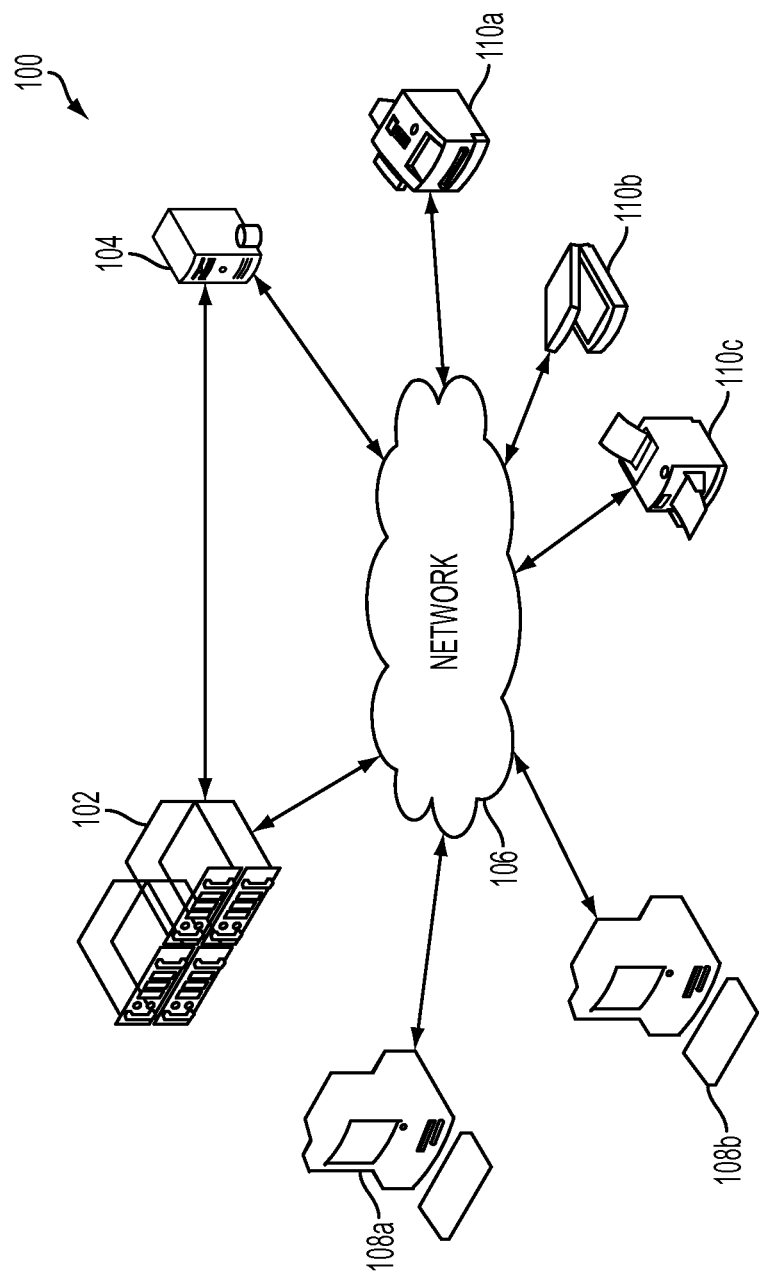
FIG. 1 is a block diagram illustrating a system environment, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the respective meanings set forth below.

A "message producer" refers to an object created by a session or a device or a hardware that produces/originates messages for a message consumer.

A "message consumer" refers to an entity (e.g., program/tool/application/device/hardware) capable of processing messages received from the message producer.

A "consumer identification rule" refers to one or more parameters defined by the message producer to identify a set of message consumers capable of processing the messages generated by the message producer. The one or more parameters may include, but not limited to, one or more message formats to be processed, quality of service required from the message consumer or functionality, functionality of the message consumers.

A "set of attributes" refers to one or more attributes associated with the message consumers. The one or more attributes may include, but not limited to, message formats processed by the message consumer, actions performed on receiving a message or quality of service parameters, such as speed, reliability, performance or load-balancing capabilities of the message consumer. The set of attributes may include one or more security parameters.

A "channel" refers to a physical or logical link to establish a communication session or a semi-permanent connection. The channel is used to convey an information signal between the message producers and the message consumers, and/or transmit messages from the message producer to the message consumer.

A "knowledge base" refers to a memory space to store the set of attributes associated with each of the message consumers. The knowledge base stores information for establishing relation in which the set of attributes associated with each of the message consumers are clustered as a node of a dendogram.

A "dendogram" refers to hierarchical clustering of nodes. The nodes are arranged as a cluster in the dendogram. A node is added to a cluster whose centroid has least semantic distance from the node. The nodes are arranged in a cluster such that the left most node(s) in a cluster has the least semantic distance with the centroid and the right most node(s) have the greatest semantic distance from the centroid.

"Semantic weight of a node" refers to the weighted mean of the semantic weights of each of the attributes in the set of attributes.

"Semantic distance" refers to difference between the semantic weights of two nodes.

"Centroid of a cluster" refers to the average of semantic weights of all the nodes in a cluster.

A "multifunction device" (MFD) refers to a device that can perform multiple functions. Examples of the functions include, but are not limited to, printing, scanning, copying, faxing, emailing, and the like.

FIG. 1 is a block diagram illustrating a system environment 100, in which, various embodiments may be implemented. The system environment 100 includes an application server 102, a database server 104, a network 106, a computing device 108*a*, a computing device 108*b*, a multifunction device (MFD) 110*a*, a scanner 110*b*, and a printer 110*c*.

Although FIG. 1 shows only two computing devices 108*a* and 108*b* for simplicity, it will be apparent to a person having ordinary skill in the art that the disclosed embodiments may be implemented for a large number of computing devices including, but not limited to, a desktop computer, a laptop, a personal digital assistant (PDA), a tablet/handheld computer, and the like. Further, in an embodiment, the system environment 100 can also include more than one printer, more than one scanner, more than one multi-function device or one or more media devices capable of executing various functions including, but not limited to, printing, scanning, image capturing, audio/video recording, or photocopying.

The application server 102 stores a messaging service for facilitating communication between message producers and message consumers. Further, the application server 102 further provides a messaging application program interface (API) to facilitate communication between the messaging service and message producers, and the messaging service and message consumers. The application server 102 stores a set of applications that may be executed by the computing devices 108. The application server 102 is further explained in detail in conjunction with FIG. 2.

The database server 104 manages a knowledge base 232 that stores a set of attributes associated with each of the message consumers. When a message consumer is registered with the messaging service, the set of attributes associated with the registered message consumer is stored in the knowledge base 232. In an embodiment, the database server 104 may be included in the application server 102. The database server 104 may be implemented using technologies including, but not limited to, Oracle®, IBM DB2®, Microsoft SQL Server®, Microsoft Access®, PostgreSQL®, MySQL® and SQLite®, and the like.

The network 106 corresponds to a medium through which the content and the message flow between various components (e.g. the application server 102, the database server 104, the computing devices 108, the MFD 110a, the scanner 110b, the printer 110c, and the like) of the system environment 100. Examples of the network 106 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 106 in accordance with various wired and wireless communication protocols, such as Transmission Control Protocol and Internet Protocol (TCP/IP), User Datagram Protocol (UDP), 2G, 3G or 4G communication protocols.

The computing devices 108 include a processor/microcontroller and/or any other electronic component, or a device or a system to perform one or more operations according to one or more programming instructions. Examples of the computing device include, but are not limited to, a desktop computer, a laptop, a personal digital assistant (PDA), a tablet/handheld computer, and the like. The computing devices 108 are capable of accessing the application server 102 via the network 106. One or more applications running on the computing devices 108 are capable of creating an object by a session and/or are used to send messages generated by the one or more applications.

Figure 2:
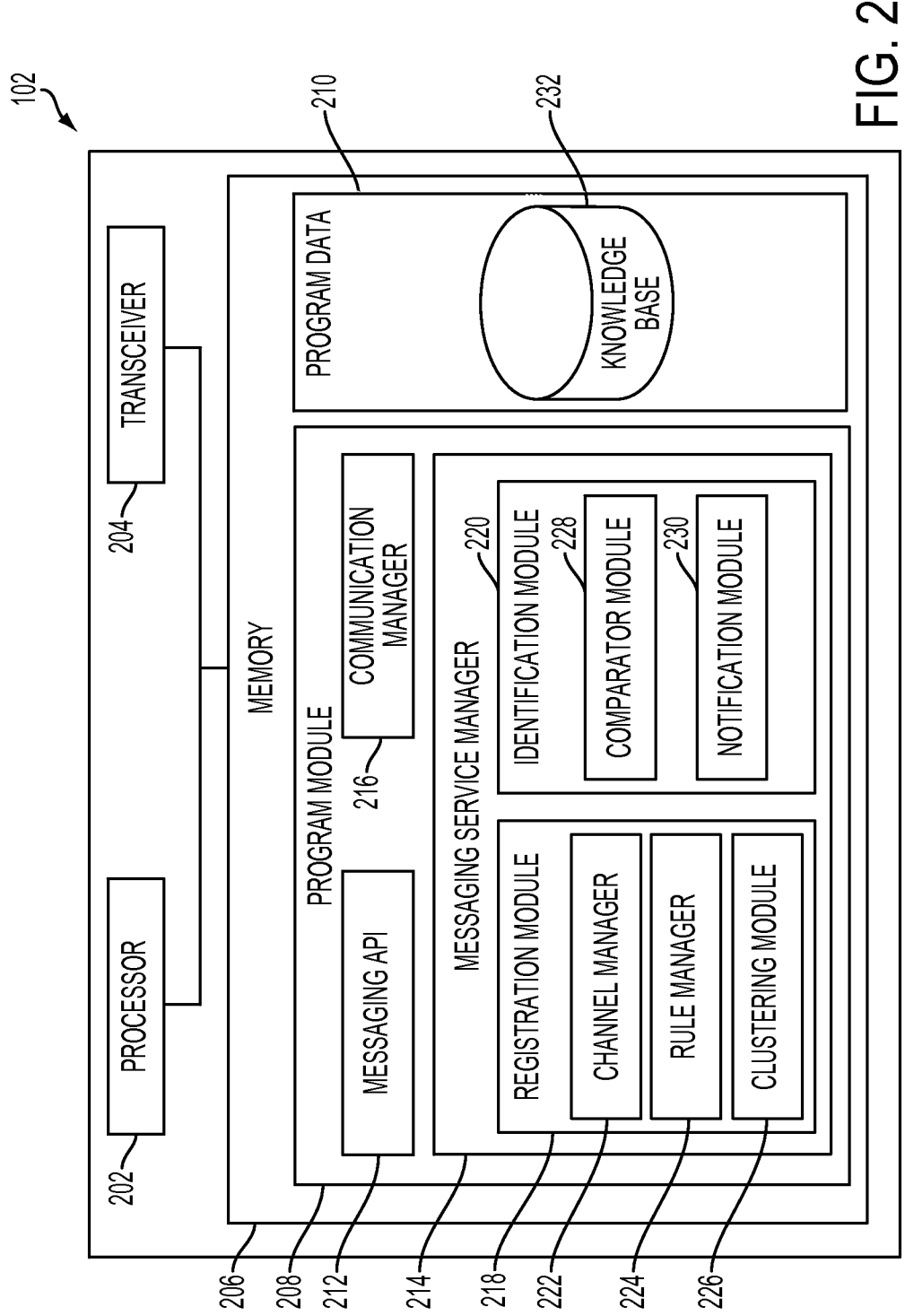
FIG. 2 is a block diagram illustrating an application server, in accordance with at least one embodiment.

FIG. 2 is a block diagram illustrating an application server 102, in accordance with at least one embodiment. The application server 102 includes a processor 202, a transceiver 204, and a memory 206. The memory 206 includes a program module 208 and a program data 210. The program module 208 includes a messaging API 212, a messaging service manager 214, and a communication manager 216. The messaging service manager 214 includes a registration module 218 and an identification module 220. The registration module 218 further includes a channel manager 222, a rule manager 224, and a clustering module 226. The identification module further includes a comparator module 228 and a notification module 230. The program data 210 includes a knowledge base 232. In an embodiment, in addition to the memory 206 and transceiver 204, the processor 202 may also be coupled to a display (not shown) and one or more input mediums (not shown).

The processor 202 executes a set of instructions stored in the memory 206 to perform the one or more operations. The processor 202 may be realized through a number of processor technologies known in the art. Examples of the processor 202 include, but are not limited to, an X86 processor, a RISC processor, an ASIC processor, a CISC processor, or any other processor. In an embodiment, the processor 202 includes a graphics-processing unit (GPU) that executes the set of instructions to perform one or more image processing operations.

The transceiver 204 transmits and receives messages and data to/from various components (e.g. the database server 104, the computing devices 108, the MFD 110a, the scanner 110b, and printer 110c) of the system environment 100 (refer FIG. 1). Examples of the transceiver 204 can include, but are not limited to, an antenna, an Ethernet port, a universal serial bus (USB) port, or any port that may be configured to receive and transmit data from external sources. The transceiver 204 transmits and receives data/messages in accordance with various communication protocols, such as Transmission Control Protocol and Internet Protocol (TCP/IP), User Datagram Protocol (UDP), and 2G, 3G, and 4G communication protocols.

The memory 206 stores a set of instructions and data. Some of the commonly known memory implementations can be, but are not limited to, a random access memory (RAM), a read only memory (ROM), a hard disk drive (HDD), and a secure digital (SD) card. The program module 208 includes a set of instructions executable by the processor 202 to perform specific actions to facilitate communication between message producers and message consumers. It is understood by a person having ordinary skill in the art that the set of instructions in conjunction with various hardware of the application server 102 enables the application server 102 to perform various operations. During the execution of instructions, data from the knowledge base 232 may be accessed by the processor 202.

The messaging API 212 defines one or more rules to send and receive messages between messaging entities and a remote entity. The messaging entities refer to the message consumers and the message producers, and the remote entity refers to the messaging service manager 214. The messaging API 212 bridges the communication between the messaging entities and the remote entity. The messaging API 212 exposes an optional web interface, called local proxy, for the messaging entities, which do not have the capability of communication with the remote entity. Further, the messaging API 212 manages serialization and de-serialization of one or more types of messages that may be exchanged among the messaging entities or between the messaging entities and messaging service manager 214.

The messaging service manager 214 manages communication between the message producers and the message consumers. The messaging service manager 214 is a set of representational state transfer (REST) web services. The messaging service manager 214 is collectively responsible for the creation, maintenance, deletion of channels associated with the message consumers and the end-to-end delivery of messages on the channels. The messaging service manager 214 manages the knowledge base 232 for all message consumers registered with the messaging service manager 214. The messaging service manager 214 allows dynamic addition and deletion of the message consumers at any point of time. The messaging service manager 214 includes the registration module 218 and the identification module 220.

The registration module 218 registers the message consumers with the messaging service manager 214. Whenever a new message consumer defines the message processing rule to register with the messaging service manager 214, the registration module 218 registers the new message consumer with the messaging service manager 214. The registration module 218 further comprises the channel manager 222, the rule manager 224, and the clustering module 226.

The channel manager 222 creates a dedicated channel when a message consumer is registered with the messaging service manager 214. All messages sent to the message consumer are received on the associated dedicated channel.

The rule manager 224 creates a set of attributes associated with each of the message consumers at the time of registration. The rule manager 224 extracts elements of a message processing rule declared by the message consumer at the time of registration. The elements of the message processing rule may include, but not limited to, one or more valid message types that can be processed by the message consumer and/or the sequence of actions performed by the message consumer on receiving the one or more valid message types. In an embodiment, the elements of the message processing rule may also include one or more security parameters associated with the message consumer. The rule manager 224 evaluates a set of quality of service parameters associated with the message consumer. The set quality of service parameters may include, but not limited to, speed, reliability, performance and/or load-handling capability of the message consumer. The elements of the message processing rule and the set of quality of service parameters are collectively referred to as the set of attributes associated with the message consumer.

The clustering module 226 clusters the set of attributes associated with the message consumers in the knowledge base 232. The clustering module 226 stores the set of attributes associated with each of the message consumers as a node in the knowledge base 232. The clustering module 226 organizes the nodes in a dendogram, where nodes with minimal semantic distance are grouped into a cluster. The clustering module 226 creates the clusters in an agglomerative fashion, where, initially, every node represents an individual cluster. A node is added to the cluster whose centroid has the least semantic distance from the node. A dendogram 300 is further explained in detail in conjunction with FIG. 3. Clustering of the nodes in the knowledge base 232 is further explained in detail in conjunction with FIG. 6.

The identification module 220 identifies a set of suitable message consumers for a message producer. The identification module 220 includes the comparator module 228 and the notification module 230.

The comparator module 228 identifies one or more message consumers suitable for communicating messages with the message producer. The comparator module 228 compares the consumer identification rule defined by the message producer with the set of attributes associated with the message consumers stored in the knowledge base 232. The comparator module 228, on the basis of the comparison, identifies a set of suitable message consumers to communicate messages with the message producer. Identifying the set of suitable message consumers is further explained in detail in conjunction with FIG. 7. The comparator module 228 further assigns channels associated with the set of suitable message consumers to the message producer.

The notification module 230 notifies the message producer when no message consumer is identified by the comparator module 228 based on the comparison. In such cases, the notification module 230 generates an error notification and sends the error notification to the message producer. In an embodiment, the notification module 230 may notify the message producer when the one or more attributes from the set of attributes associated with one or more identified message consumers do not match the consumer identification rule associated with the message producer. In an embodiment, the notification module 230 may notify the message producer when one or more message consumers are identified. For example, the notification may include, but not limited to, similarity between the consumer identification rule and the set of attributes associated with each of the identified message consumers.

The communication manager 216 initiates the communication between the message producer and the one or more identified message consumers. The communication manager 216 selects a channel from the one or more channels associated with the identified message consumers and initiates communication between the message producer and the message consumer associated with the selected channel. In an embodiment, the communication manager 216 may select more than one channels and initiate communication between the message producer and message consumers associated with the selected more than one channels.

The knowledge base 232 stores the set of attributes associated with each of the message consumers registered with the messaging service manager 214. The set of attributes associated with each of the message consumers are clustered as nodes of the dendogram 300 in the knowledge base 232.

Figure 3:
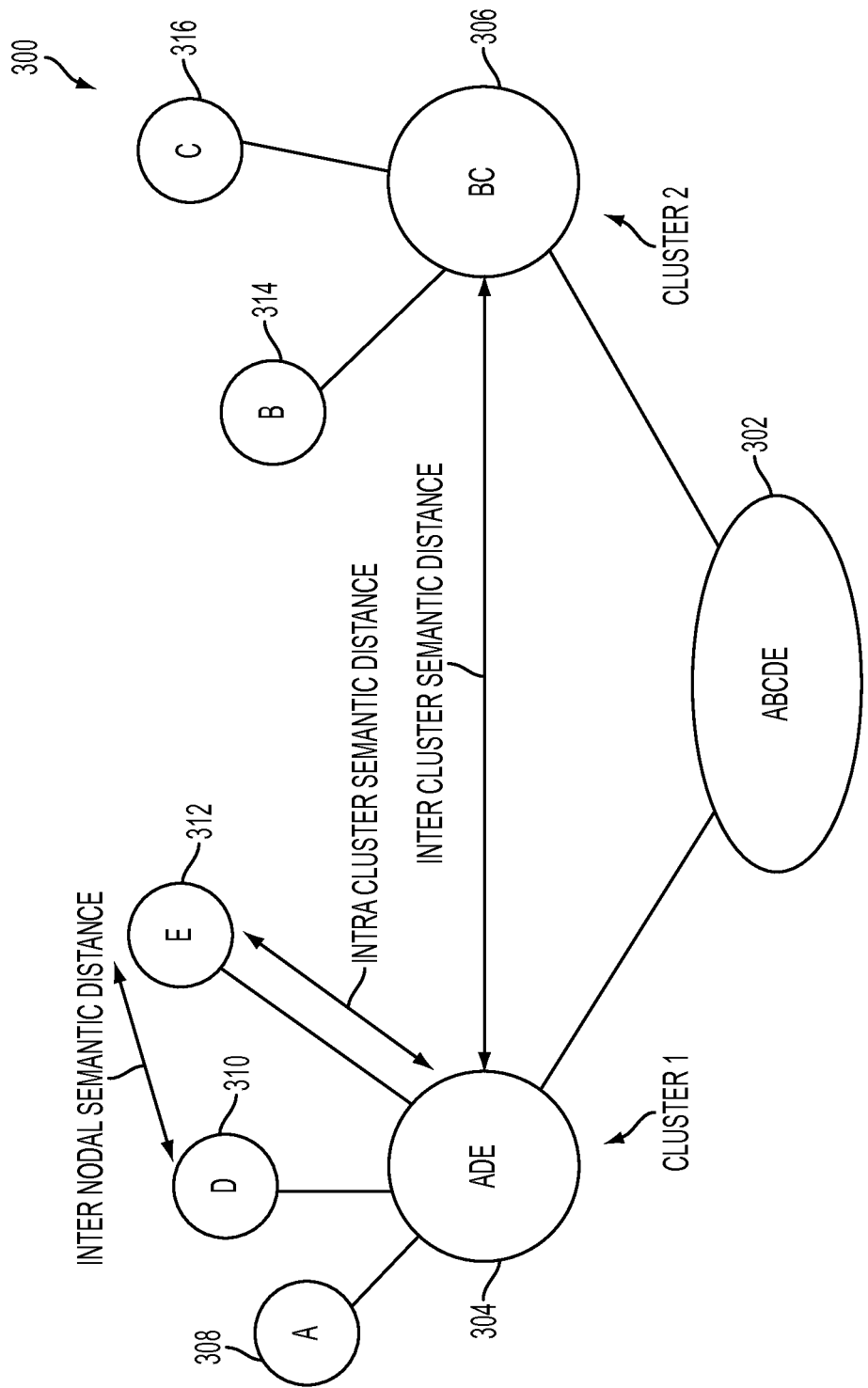
FIG. 3 is a dendogram representation of arranging nodes associated with message consumers in a knowledge base, in accordance with at least one embodiment.

FIG. 3 is a dendogram representation of arranging nodes associated with message consumers in the knowledge base 232, in accordance with at least one embodiment. Five nodes A, B, C, D, and E are associated with five message consumers registered with the messaging service manager 214. The set of attributes associated with a message consumer is represented by a node in the dendogram 300. Although FIG. 3 shows only five nodes for simplicity, it will be apparent to a person having ordinary skill in the art that the disclosed embodiments may be implemented for a large number of nodes.

The nodes A, B, C, D, and E are registered with the messaging service manager 214 (depicted by 302). The nodes with equal or nearly equal semantic weights are clustered together. The nodes A, D, and E having equal or nearly equal semantic weights are clustered in a cluster 304 and the nodes B and C having equal or nearly equal semantic weights are clustered in a cluster 306.

The nodes are arranged in a cluster based on the semantic distance between the nodes and the centroid of the cluster. In cluster 304, the semantic distance between the node A and the centroid of cluster 304 is minimum and the semantic distance between the node E and the centroid of cluster 304 is maximum. The node A is arranged at a left most position 308 of the cluster 304 and the node E is arranged at a right most position 312 of the cluster 304. The node D is arranged in a position 310 between node A and node E.

In the cluster 306, the semantic distance between the node B and the centroid of the cluster 306 is minimum, and the semantic distance between the node C and the centroid of the cluster 306 is maximum. The node B is arranged at a left most position 314 of the cluster 306 and the node C is arranged at a right most position 316 of the cluster 306.

Figure 4A:
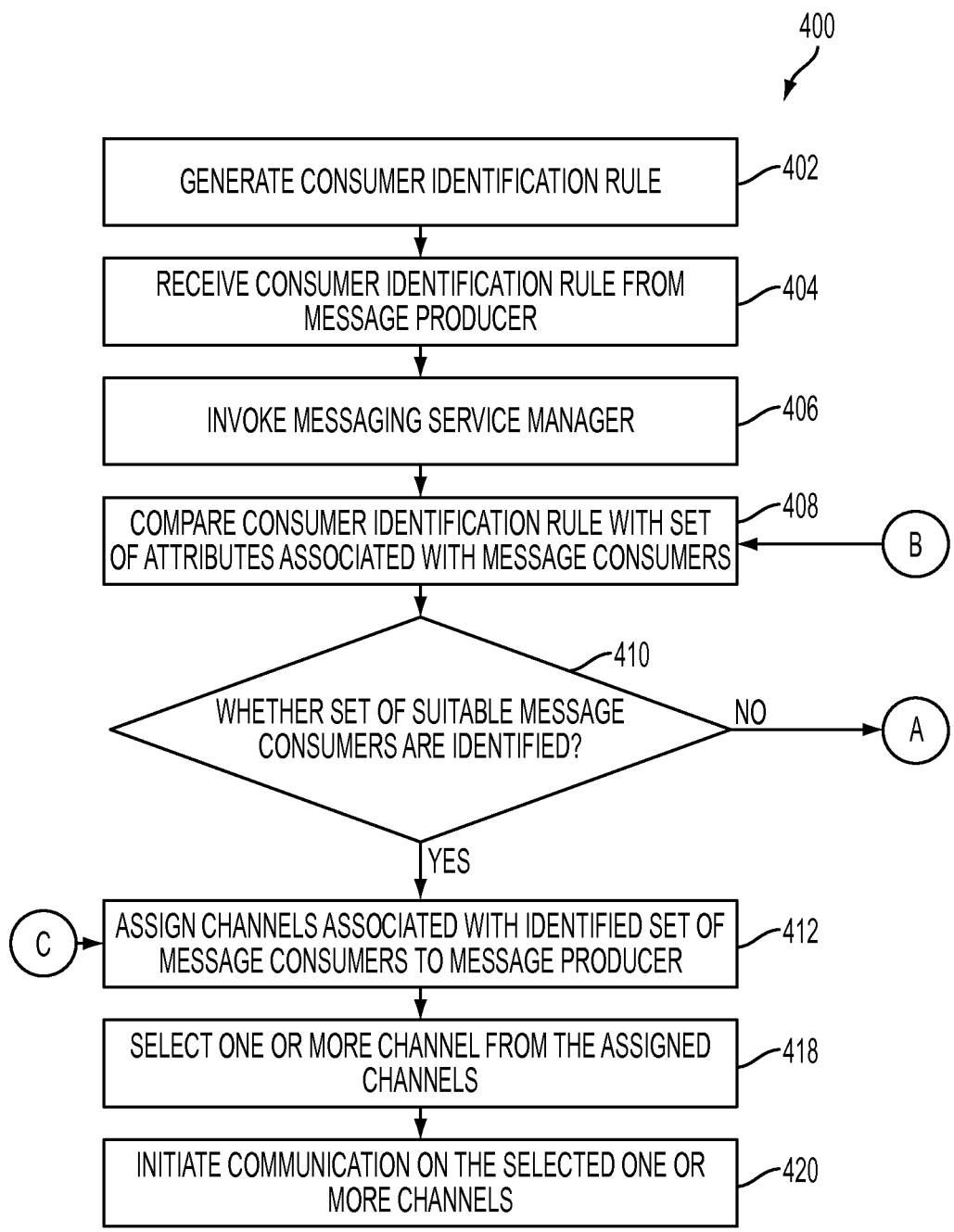
FIGS. 4A and 4B is a flowchart illustrating a method for facilitating communication between message consumers and message producers, in accordance with at least one embodiment.
Figure 4B:
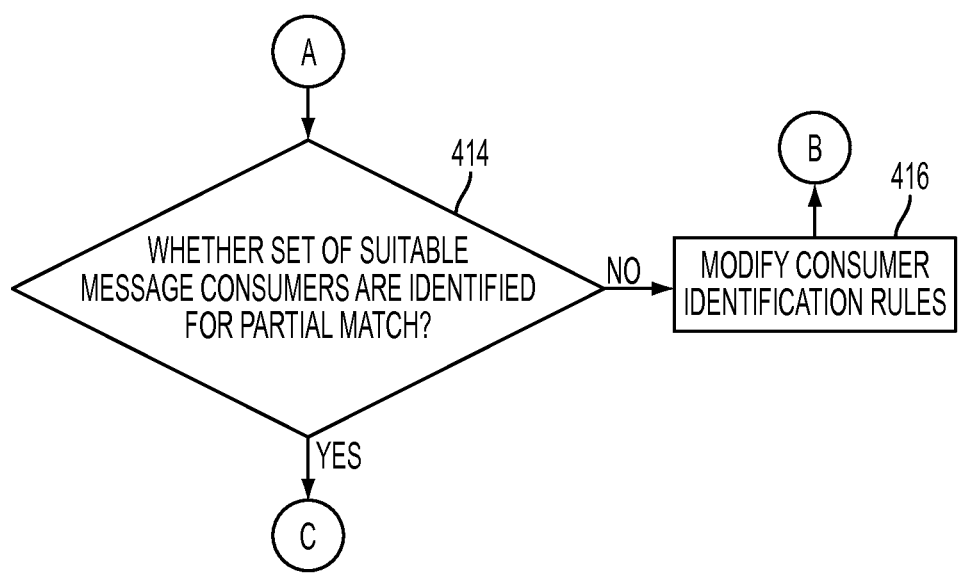

FIG. 4A and FIG. 4B is a flowchart 400 illustrating a method for facilitating communication between the message consumers and the message producers, in accordance with at least one embodiment.

At step 402, a consumer identification rule is defined by a message producer. The message producer declares the one or more parameters as the consumer identification rule to identify a set of suitable message consumers. The one or more parameters to identify the set of suitable message consumers may include, but not limited to, a pre-determined message consumer, message format based discovery of the message consumers, functionality based discovery of the message consumers, quality of service based discovery of the message consumers or combination of above parameters.

The one or more parameters used by the message producer in the consumer identification rule may vary depending on the nature of the message producer application/hardware/device. Following are some of the methods/techniques for facilitating communication between the message producer and the message consumer:

A pre-determined message consumer: The message producer may choose to communicate with a pre-determined message consumer when it is aware of availability of such a message consumer. The message producer determines the relevant channel for communication by using the type of the message consumer. In an embodiment, the consumer identification rule may be declared as follows:

```
rule "CustomConsumer only"
consumer-type = com.my.CustomConsumer
```

The messaging service manager 214 identifies the channel on which the specified message consumer is registered, and returns the associated channel to the message producer.

Message format based discovery of the message consumer: The message producer may only be interested in finding a message consumer that can correctly interpret the messages generated by the message producer. The message producer may not be concerned with how the messages are processed, as long as the message format is supported by the message consumer. In an embodiment, the consumer identification rule may be declared as follows:

---
rule "I produce PNG images"
message-type = image/png
---

Functionality-based discovery of the message consumer: When the message producer creates a task as a message and defines the one or more rules for processing the message, which specifies exactly how the message has to be processed. The message producer may only be interested in finding message consumers that can perform the task as per the defined one or more rules. For example, the message producer may create documents for printing. The message producer may be interested in identifying the message consumer from one or more potential print services at its disposal. However, the message producer requires that the document to be printed in black and white and on an A4 size sheet. In this case, the message producer defines the consumer identification rule as follows:

---
rule "Print My Document"
when
   m :Microsoft Word Document
then
   use_A4_paper( );
   print_in_black_and_white( )
---

The messaging service manager 214 identifies a message consumer that performs the task exactly as specified, by matching with the defined one or more rules for processing the message.

Quality of service based discovery of the message consumer: The message producer may distinguish between message consumers based on the quality of service offered by each message consumer. Quality of service includes factors, such as performance, speed, reliability, load handling, and the like. For example, the message producer may be interested in identifying a message consumer that is highly reliable and capable of handling network failures. In such cases, the message producer may declare the consumer identification rule as follows:

---
rule "High reliability consumers only"
consumer-reliability = high
---

Customized discovery of the message consumer: The message producer may choose to combine one or more above defined parameters and create a custom consumer identification rule that defines multiple parameters. For example, a message producer may be interested in identifying a message consumer that can process a Microsoft Word document at the highest speed and declares its consumer identification rule as follows: In such a case, the message producer may define the consumer identification rule as follows:

---
rule "High speed Word Document processor"
message-type = Microsoft Word Document
consumer-speed = high
---

At step 404, the consumer identification rule is received by the messaging API 212. The message producer forwards the consumer identification rule to a query API of the messaging API 212. The query API forwards the request to the local proxy of the messaging API 212.

At step 406, the messaging service manager 214 is invoked to access the knowledge base 232. When the consumer identification rule is received by the local proxy of the messaging API 212, the local proxy invokes the messaging service manager 214 by forwarding the consumer identification rule to the messaging service manager 214.

At step 408, the set of suitable message consumers are identified. The consumer identification rule is compared with the set of attributes associated with the message consumers stored in the knowledge base 232 by the comparator module 228 to identify the set of suitable message consumers. The comparison determines the extent of similarity between the consumer identification rule and the set of attributes associated with the message consumers. In an embodiment, the set of suitable message consumers are identified when the consumer identification rule is more than 90 percent similar to the set of attributes associated with the message consumers. Those skilled in the art will understand that the percentage of similarity is simply for illustration/example purposes. The percentage may be customized based on user requirement. Identifying the set of suitable message consumers, based on the comparison, is further explained in detail in conjunction with FIG. 6.

At step 410, whether the set of suitable message consumers is identified based on the similarity is checked.

In instance where the set of suitable message consumers are identified, then at step 412, a set of channels associated with the set of suitable message consumers are assigned to the message producer by the comparator module 228. In an embodiment, when more than one suitable message consumers are identified, the message producer may introduce additional parameters in the consumer identification rule to decrease the number of suitable message consumers identified based on the comparison.

In instance where no suitable message consumers is identified, at step 414, a set of suitable message consumers are identified for which the consumer identification rule is partially similar to the set of attributes associated with the message consumers. In an embodiment, partial similarity corresponds to 75-90 percent similarity between the consumer identification rule and the set of attributes associated with the message consumers. Those skilled in the art would understand that the mentioned percentage of partial similarity is simply for illustration/example purposes. The percentage may be customized based on user requirement.

In instance where a set of suitable message consumers is identified for partial similarity, the control passes to step 412. In an embodiment, one or more notifications associated with the set of suitable message consumers, for which the set of attributes are partially similar to the consumer identification rule, are sent to the message producer by the notification module 230. In an embodiment, the one or more notifications indicate which of the attributes of the identified message consumers are not similar to the consumer identification rule.

In instance where none of the suitable message consumers is identified for partial similarity, the control passes to step 416. In an embodiment, an error notification is generated by the notification module 230 and sent to the message producer notifying the message producer to broaden the consumer identification rule.

At step 416, the consumer identification rule is modified by the message producer. In an embodiment, the message producer may broaden the consumer identification rule by reducing the one or more parameters declared by the message producer to identify the set of suitable message consumers. The control then passes to step 408.

At step 418, at least one channel from the one or more channels assigned in step 412 is selected by the communication manager 216. In an embodiment, when more than one channel is assigned to the message producer, the message producer may select one channel at random associated with a message consumer. Further, in an embodiment, the message producer may select more than one channel by scheduling messages in a round-robin fashion to the message consumers associated with the more than one channel. Those skilled in the art will understand that the disclosed methods for selecting the at least one channel associated with the identified set of suitable message consumers is simply for illustration/example purposes. Any other suitable method may be used by the communication manager 216 to select the at least one channel.

At step 420, the communication between the message producer and the message consumer is initiated on the selected channel by the communication manager 216.

Figure 5:
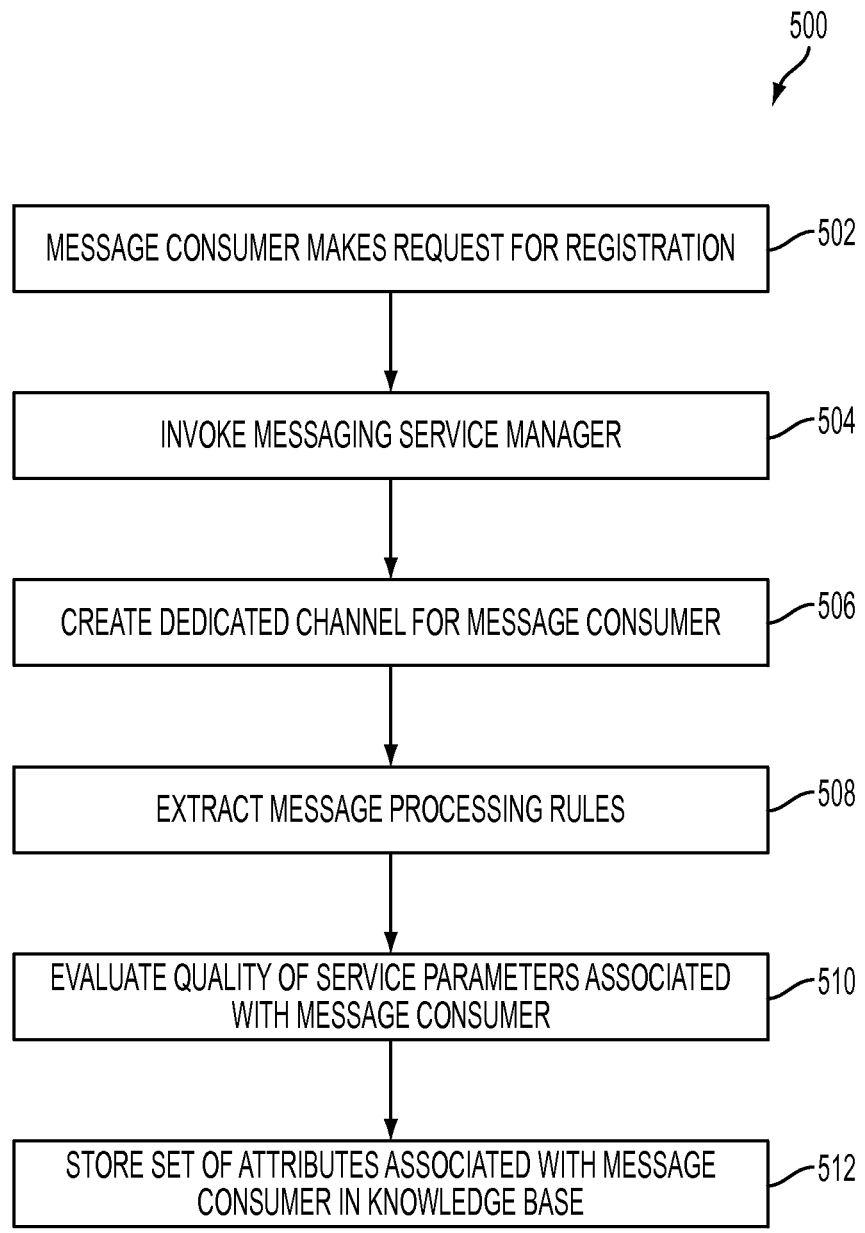
FIG. 5 is a flowchart illustrating a method for registering message consumers with a messaging service manager, in accordance with at least one embodiment.

FIG. 5 is a flowchart illustrating a method for registering the message consumers with the messaging service manager 214, in accordance with at least one embodiment. The message consumers are required to register with the messaging service manager 214, before the message consumers are ready to receive messages from the message producers.

At step 502, a message consumer makes a request for registration to the messaging API 212. The message consumer can register itself by declaring a message processing rule with a registration API, functioning as a part of the messaging API 212. In an embodiment, the message processing rule is written in an expression language, such as MVEL. Those skilled in the art would understand that the expression language, such as MVEL is simply for illustration/example purposes. The message processing rule may be written in other expression languages as well. In an embodiment, the message processing rule may include, but not limited to, one or more valid message types that may be processed by the message consumer and/or sequence of actions performed by the message consumer on receiving the one or more valid message types.

At step 504, the messaging API 212 invokes the messaging service manager 214. When the registration request is made by the message consumer, the registration API functioning as part of the messaging API 212 instantiates the message consumer and the instance on the local proxy of the messaging API 212 persists. The local proxy then invokes the messaging service manager 214 with the message processing rule declared by the message consumer. The message processing rules are received by the rule manager 224 of the messaging service manager 214.

At step 506, a dedicated channel is created for the message consumer by the channel manager 222 of the messaging service manager 214. A unique identifier of the dedicated channel, and a call back method with which the messaging service manager 214 communicates to retrieve the local proxy associated with the message consumer, are stored in the knowledge base 232 by the channel manager 222. The unique identifier is returned to the local proxy by the channel manager 222. The local proxy maps the channel identifier to the message consumer instance in the messaging API 212. The local proxy can now deliver all the messages received on the channel to the corresponding message consumer instance in the messaging API 212.

At step 508, the message processing rules are extracted by the rule manager 224. The one or more valid message types that may be processed by the message consumer and/or the sequence of actions performed by the message consumer on receiving the one or more valid message types are extracted from the message processing rules by the rule manager 224.

At step 510, a set of quality of service parameters are evaluated by the rule manager 224. The quality of service on various parameters associated with the message consumer, such as speed, reliability, performance, and load handling, is evaluated by the rule manager 224. In an embodiment, identical techniques are used to evaluate all the message consumers to ensure that the assessment process is consistent across all the message consumers.

At step 512, a set of attributes associated with the message consumer are stored in the knowledge base 232 by the clustering module 226. The message processing rules extracted by the rule manager 224 at step 508 and the set of quality of service parameters evaluated by the rule manager 224 at step 510 are collectively stored as the set of attributes associated with the message consumer in the knowledge base 232 by the clustering module 226. In an embodiment, the set of attributes may include a set of security parameters associated with the message consumer. Various examples of the security parameters may include, but are not limited to, level of confidentiality and public or private access to the message consumer or network of the message consumer.

In an embodiment, when the message consumer is registered with the messaging service manager 214, the set of attributes associated with the message consumer is clustered as a node in the knowledge base 232 by the clustering module 226. Clustering of the nodes in the knowledge base 232 is further explained in detail in conjunction with FIG. 6.

Figure 6:
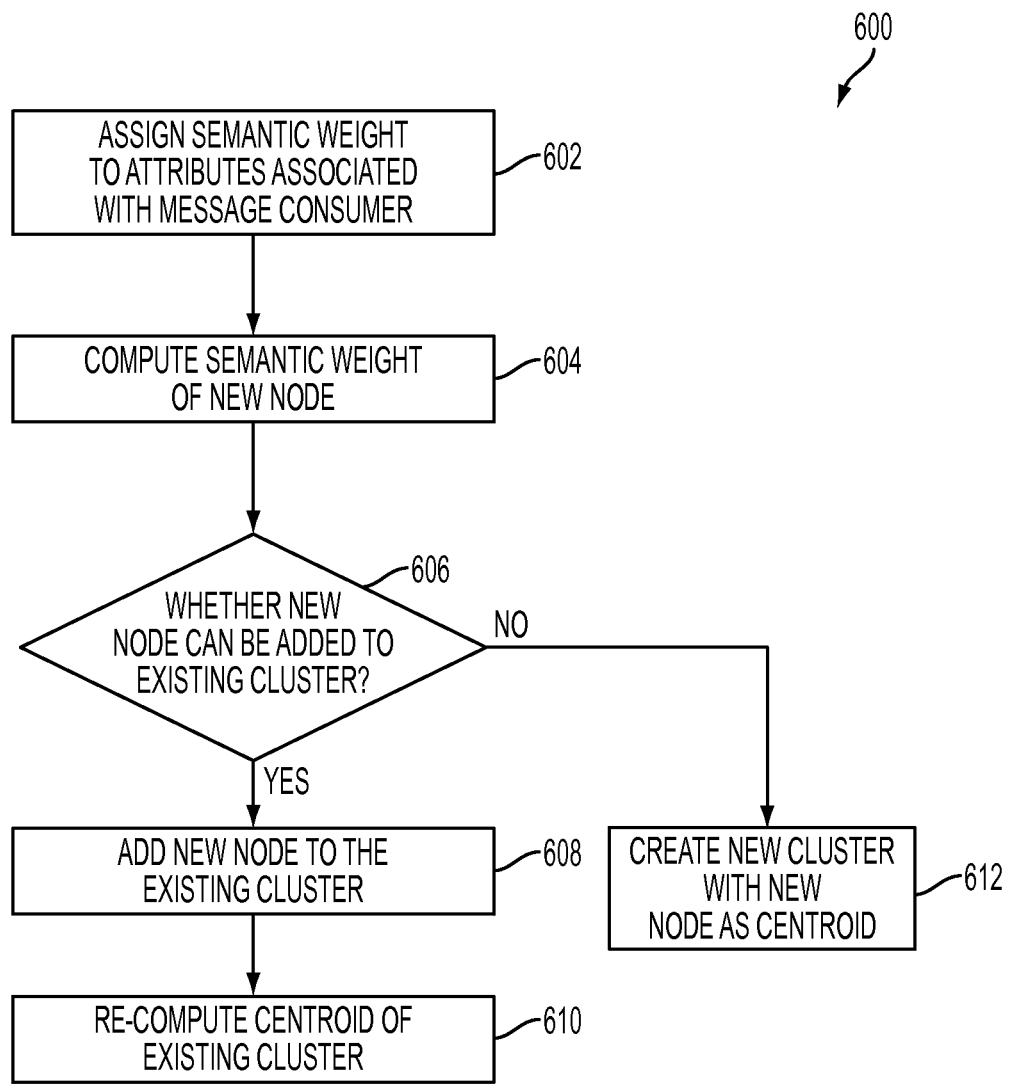
FIG. 6 is a flowchart illustrating a method of clustering a newly registered message consumer in the knowledge base, in accordance with at least one embodiment.

FIG. 6 is a flowchart 600 illustrating a method of clustering a newly registered message consumer in the knowledge base 232. The set of attributes associated with each of the message consumers is clustered as a node of the dendogram 300 in the knowledge base 232.

At step 602, each of the consumer attributes defined in the set of attributes associated with the new message consumer is assigned a semantic weight by the clustering module 226.

At step 604, the semantic weight of the new node is computed. The weighted mean of the semantic weights of all the consumer attributes is computed by the clustering module 226 to calculate the semantic weight of the new node.

At step 606, whether the new node may be added to any of the existing clusters in the dendogram 300 is determined by the clustering module 226. To determine whether the new node may be added to any of the existing clusters in the dendogram 300, a centroid of all the clusters are iterated in a sequence to find the cluster with the least semantic distance from the new node.

In instance where an existing cluster with the least semantic distance from the new node is found, at step 608, the new node is added to the existing cluster by the clustering module 226. The new node is added in an appropriate position in the existing cluster. The semantic distance between the new node and the centroid of the existing cluster is determined by the clustering module 226 to add the new node in the appropriate position of the existing cluster. In an embodiment, all the nodes in a cluster are sorted based on the semantic distance between the node and the centroid of the cluster. Further, in an embodiment, the left-most node has the least semantic distance with the centroid of the cluster and the right-most node has the maximum semantic distance with the centroid of the cluster.

At step 610, the centroid of the existing cluster is recomputed by calculating the mean of the semantic weights of all the nodes including the new node in the existing cluster. In an embodiment, the centroid of a cluster is the mean of the semantic weights of all the nodes in the cluster.

In an instance where the existing cluster with the least semantic distance from the new node is not found, at step 612, a new cluster is formed by the clustering module 226 with the new node as the centroid.

Those skilled in the art will readily appreciate that the method of clustering a newly registered message consumer in the knowledge base 232 with respect to the FIG. 6 is simply for illustration/example purposes and should not be considered limiting in any manner. The needs of a particular application may yield multiple alternate and suitable approaches to implement indexing of the nodes in the knowledge base 232.

Figure 7:
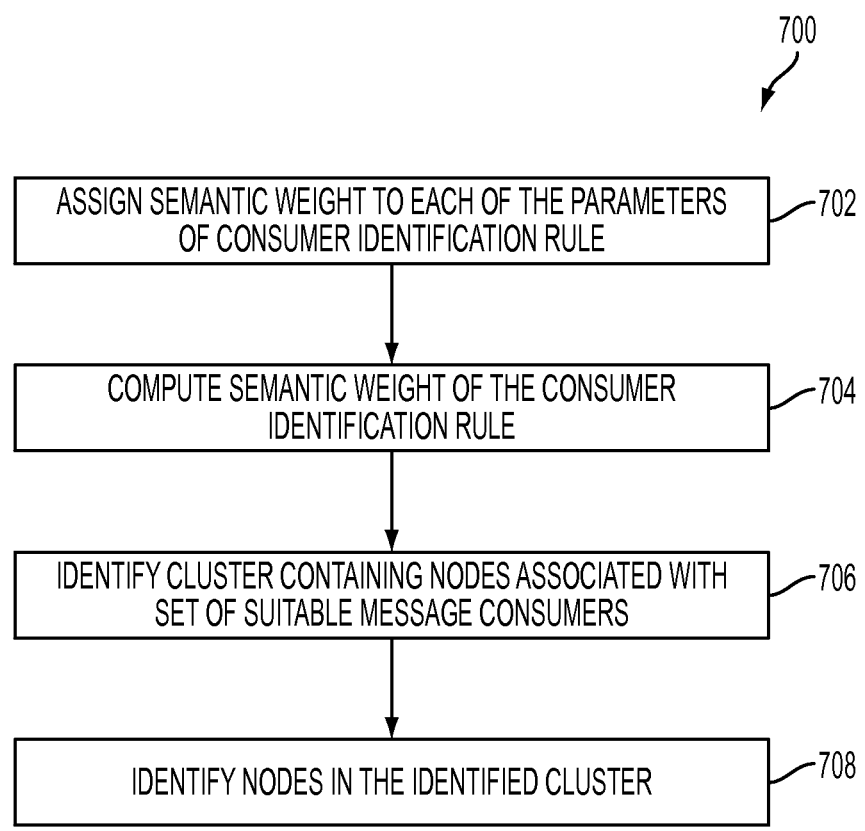
FIG. 7 is a flowchart illustrating a method of identifying set of suitable message consumers for a message producer, in accordance with at least one embodiment.

FIG. 7 is a flowchart 700 illustrating a method of identifying a set of suitable message consumers for a message producer, in accordance with at least one embodiment.

At step 702, a semantic weight is assigned to each of the one or more parameters declared by the message consumer as the consumer identification rule by the comparator module 228.

At step 704, the semantic weight of the consumer identification rule is computed by the comparator module 228. The weighted mean of the semantic weights of each of the parameters is computed by the comparator module 228 to calculate the semantic weight of the consumer identification rule.

At step 706, a cluster containing the nodes associated with the set of suitable message consumers is identified in the dendogram 300 stored in the knowledge base 232. The cluster is identified by iterating through the centroids of the clusters in a sequence. The sequence of iteration is based on the semantic weights of the centroids of the respective clusters. The semantic weight of the consumer identification rule is compared with the centroid of the iterated clusters by the comparator module 228 to identify the cluster with least semantic distance from the consumer identification rule. In an embodiment, the comparator module 228 may iterate the clusters in ascending order of their respective semantic weights in the dendogram 300. Further, in an embodiment the clusters may be iterated in descending order of their respective semantic weights in the dendogram 300.

At step 708, nodes associated with the set of suitable message consumers are identified from the cluster identified at step 606. The semantic weight of the consumer identification rule is compared with the semantic weight of the nodes of the identified cluster and based on the comparison semantic distance between the consumer identification rule and the nodes is computed by the comparator module 228. Nodes with semantic distance less than a predefined value are identified as the nodes associated with the set of suitable message consumers. In an embodiment, the message producer may declare the predefined value to identify the set of message consumers.

Those skilled in the art would readily appreciate that the method of identifying the set of suitable message consumers for a message producer with respect to the FIG. 7 is simply for illustration/example purposes. The needs of a particular application may yield multiple alternate and suitable approaches to implement identification of the set of suitable message consumers.

FIG. 8 is a message flow diagram illustrating the flow of messages between various components of the system environment in accordance with at least one embodiment. For example, an application running on the computing device 108*a* refers to the message producer and the multi-function device 110*a* refers to the most suitable message consumer selected by the message producer.

When a message producer wants to send messages, the message producer declares a consumer identification rule (depicted by 802). The message producer refers to an application executed in the computing device 108*a*. Further, the message producer requests the query API in the messaging API 212 to invoke the messaging service manager 214 (depicted by 804).

The query API forwards the request to a local proxy in the messaging API 212 (depicted by 806). Thereafter, the local proxy invokes the messaging service manager 214 by forwarding the consumer identification rule to the messaging service manager 214 (depicted by 808).

Thereafter, the messaging service manager 214 identifies a set of suitable message consumers from the knowledge base 232 (depicted by 810). The messaging service manager 214 assigns the channels associated with the identified set of suitable message consumers to the message producer (depicted by 812). The messaging service manager 214 sends the unique channel identifier associated with the channels of the identified set of suitable message consumers to the message producer.

Thereafter, the message producer selects a channel associated with the most suitable message consumer (MFD 110*a*) from the assigned channels (depicted by 814). The message producer after selecting the channel sends the message and the channel identifier associated with the selected channel to the messaging API 212 (depicted by 816).

Thereafter, the messaging API 212 serializes the message received from the message producer to an XML format (depicted by 818). The messaging API 212 then forwards the serialized message and the channel identifier to the messaging service manager 214 (depicted by 820).

The messaging service manager 214 retrieves the call back method of the local proxy associated with the identified message consumer from the knowledge base 232 (depicted by 822). The call back method of the local proxy is stored in the knowledge base 232 at the time of registration of the message consumer with the messaging service manager 214. (Step 506)

Thereafter, the messaging service manager 214 then forwards the serialized message to the retrieved proxy depicted by (824). The retrieved proxy de-serializes the serialized message and delivers the message to the message consumer associated with the retrieved proxy. When the message consumer is ready to process the message, the local proxy delivers the message to the message consumer by invoking an appropriate method on the interface of the message consumer. In an embodiment, when the message consumer is not ready to process the messages received from the message producer, the local proxy queues the message until the message consumer polls for the message. The messages are queued locally and the message consumer can receive the message later by simple messaging API 212 invocation. Further, in an embodiment, when the message consumer is always available to process the message, the message consumer may declare to the local proxy to deliver the message responsive to the reception of the message. The local proxy is not required to check the availability of the message consumer. In yet another embodiment, the message consumer may require some time to process the message. In such cases, the message consumer at the time of registration may declare to the local proxy to queue the message until the message consumer polls for the message.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be a RAM or a ROM. The computer system further comprises a storage device, which may be a hard-disk drive or a removable storage drive, such as a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as the reception of data from other sources. The communication unit may include a modem, an Ethernet card, or other similar devices, which enable the computer system to connect to databases and networks, such as LAN, MAN, WAN, and the Internet. The computer system facilitates inputs from a user through input devices accessible to the system through the I/O interface.

In order to process input data, the computer system executes a set of instructions that is stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described may also be implemented using only software programming or only hardware or by a varying combination of the two techniques. The disclosure is independent of the programming language and the operating system used in the computers. The instructions for the disclosure can be written in all programming languages including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure may also be implemented in all operating systems and platforms including, but not limited to, 'Unix', 'DOS', 'Android', 'Symbian', and 'Linux'.

The programmable instructions may be stored and transmitted on a computer-readable medium. The disclosure can also be embodied in a computer program product comprising a computer-readable medium, or with any product capable of implementing the above methods and systems, or the numerous possible variations thereof.

The system, method, and computer program product, as described above, have numerous advantages. Some of these advantages may include, but are not limited to, dynamic addition and deletion of the message consumers and the message producers to the messaging service manager 214 and/or validating the messaging channel to ensure the message producer that it is communicating messages with the most suitable message consumer. A new message consumer can be registered at any point in time with the messaging service manager 214 by declaring the message processing rule. In addition, existing message consumers can be deleted from the messaging service manager 214 by deleting the node associated with the message consumer in the knowledge base 232. Addition and deletion of messaging entities does not require a restart of the messaging service manager 214. Further, comparing the consumer identification rule with the set of attributes associated with the message consumers validates that the message producer is communicating with an appropriate message consumer. The above disclosure is aligned with the dynamic nature of current business requirements by providing a framework for real-time communication by seamlessly updating messaging systems and removing obsolete systems.

Various embodiments of the method and system for facilitating communication between message consumers and message producers have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps, and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, and the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for facilitating communication between message consumer devices and message, producer devices, the method comprising:
   in an application server communicably connected to one or more message consumer devices and message producer devices via a computer network:
   receiving, by one or more processors, a consumer identification rule from a message producer device over the communication network, wherein the consumer identification rule comprises one or more parameters associated with a task, wherein the one or more parameters comprise a message format requirement and a function requirement, the function requirement comprising a requirement to print a message;
   clustering, by the one or more processors, a set of attributes associated with each of the message consumer devices to generate one or more clusters, based on a second semantic weight associated with each of the set of attributes, wherein each of the set of attributes comprises a message format capability and a function capability, the function capability comprising a capability to print the message;
   comparing, by the one or more processors, the consumer identification rule with the set of attributes associated with each of the message consumer devices, wherein the comparison comprises:
      assigning, by the one or more processors, a first semantic weight to each of the one or more parameters in the consumer identification rule, and
      determining, by the one or more processors, a cumulative semantic weight of the consumer identification rule, wherein the cumulative semantic weight corresponds to a weighted mean of the first semantic weight assigned to each of the one or more parameters, wherein the cumulative semantic weight of the consumer identification rule is compared with a centroid of each cluster of the one or more clusters;
   identifying, by the one or more processors, a valid first set of message consumers dynamically from the message consumer devices to process the task, based on the comparison of the consumer identification rule with the set of attributes stored in a knowledge base;
   assigning, by the one or more processors, a physical communication channel associated with at least one message consumer device from the first set of message consumer devices to the message producer device; and
   initiating, by the one or more processors, communication between the message producer device and the at least one message consumer device in real-time through the physical communication channel,
   wherein the at least one message consumer device receives the message via the physical communication channel and prints the message.

2. The method of claim 1, further comprising registering, by the one or more processors, the message consumer devices, wherein the set of attributes are defined for each of the message consumers during the registration.

3. The method of claim 2, wherein the set of attributes associated with each of the message consumer devices is represented by a node.

4. The method of claim 2, further comprising assigning, by the one or more processors, a dedicated physical communication channel to each of the message consumer devices during the registration.

5. The method of claim 1, wherein the first set of message consumer devices are identified based on a degree of similarity between the consumer identification rule and the set of attributes, wherein the degree of similarity is determined based on the comparison between the consumer identification rule and the set of attributes.

6. The method of claim 1, further comprising generating, by the one or more processors, an error notification and transmitting, by the one or more processors through a transceiver, the error notification to the message producer device when no message consumer device is identified based on the comparison between the consumer identification rule with the set of attributes.

7. The method of claim 6, further comprising modifying, by the one or more processors, the consumer identification rule on reception of the error notification, wherein the modified consumer identification rule is compared with the set of attributes to identify a second set of message consumer devices from the message consumer devices.

8. The method of claim 1, wherein the set of attributes further comprises a set of message processing rules and a set of security parameters.

9. The method of claim 8, wherein the set of message processing rules comprises a message type and a set of actions performed by the message consumer devices on receiving a message.

10. The method of claim 8, wherein the set of quality of service parameters comprises at least one of speed, reliability, performance, or load handling of the message consumer devices.

11. The method of claim 8, wherein the set of security parameters comprises at least one of level of confidentiality, public or private access to the message consumer device or network of the message consumer device.

12. An application server for facilitating communication between message consumer devices and message producer devices via a computer network, the application server comprising:
   one or more processors configured to:
   receive a consumer identification rule from a message producer device over the communication network, wherein the consumer identification rule comprises one or more parameters associated with a task, wherein the one or more parameters comprise a message format requirement and a function requirement, the function requirement comprising a requirement to print a message;
   cluster a set of attributes associated with each of the message consumer devices to generate one or more clusters, based on a second semantic weight associated with each of the set of attributes, wherein each of the set of attributes comprises a message format capability and a function capability, the function capability comprising a capability to print the message;
   compare the consumer identification rule with the set of attributes associated with each of the message consumer devices, wherein the comparison comprises:
      assigning a first semantic weight to each of the one or more parameters in the consumer identification rule, and
      determining a cumulative semantic weight of the consumer identification rule, wherein the cumulative semantic weight corresponds to a weighted mean of the first semantic weight assigned to each of the one or more parameters, wherein the cumulative semantic weight of the consumer identification rule is compared with a centroid of each cluster of the one or more clusters;

identify a valid first set of message consumer devices dynamically from the message consumer devices to process the task, based on the comparison of the consumer identification rule with the set of attributes stored in a knowledge base;

assign a physical communication channel associated with at least one message consumer device from the first set of message consumer devices to the message producer device; and initiate communication between the message producer device and the at least one message consumer device in real-time through the physical communication channel, wherein the at least one message consumer device receives the message via the physical communication channel and prints the message.

13. The application server of claim 12, wherein the one or more processors are further configured to register the message consumer devices, wherein a rule manager is configured to define the set of attributes for each of the message consumer devices during the registration.

14. The application server of claim 13, wherein the one or more processors are further configured to assign a dedicated physical communication channel to each of the message consumer devices during the registration.

15. The application server of claim 13, wherein the set of attributes associated with each of the message consumer devices is represented by a node.

16. The application server of claim 12, wherein the first set of message consumer devices are identified based on a degree of similarity between the consumer identification rule and the set of attributes, wherein the degree of similarity is determined based on the comparison of the consumer identification rule with the set of attributes.

17. The application server of claim 12, wherein the one or more processors are further configured to generate an error notification and returning the error notification to the message producer device when no message consumer device is identified based on the comparison of the consumer identification rule with the set of attributes.

18. The application server of claim 17, wherein the consumer identification rule is modified by the message producer device, wherein the modified consumer identification rule is compared with the set of attributes to identify a second set of message consumer devices from the message consumers.

19. A computer program product for use with a computer, the computer program product comprising a non-transitory computer-readable medium storing a computer-readable program code embodied therein for facilitating communication between message consumer devices and message producer devices via a computer network, the computer-readable program code is executable by one or more processors in the computer to:

receive a consumer identification rule from a message producer device over the communication network, wherein the consumer identification rule comprises one or more parameters associated with a task, wherein the one or more parameters comprise a message format requirement and a function requirement, the function requirement comprising a requirement to print a message;

cluster a set of attributes associated with each of the message, to generate one or more clusters, based on a second semantic weight associated with each of the set of attributes, wherein each of the set of attributes comprises a message format capability and a function capability, the function capability comprising a capability to print the message;

compare the consumer identification rule with the set of attributes associated with each of the message consumer devices, wherein the comparison comprises:

assigning a first semantic weight to each of the one or more parameters in the consumer identification rule, and determining a cumulative semantic weight of the consumer identification rule, wherein the cumulative semantic weight corresponds to a weighted mean of the first semantic weight assigned to each of the one or more parameters, wherein the cumulative semantic weight of the consumer identification rule is compared with a centroid of each cluster of the one or more clusters;

identify at least one valid message consumer device dynamically from the message consumers, to process the task, based on the comparison of the consumer identification rule with the set of attributes associated with each of the message consumer devices, wherein the set of attributes are stored in a knowledge base;

assign a physical communication channel associated with the at least one message consumer device to the message producer device; and initiate communication between the message producer device and the at least one message consumer device in real-time through the physical communication channel, wherein the at least one message consumer device receives the message via the physical communication channel and prints the message.

20. The method of claim 3, wherein the centroid, of each cluster of the one or more clusters, is determined based on a mean of the second semantic weight associated with the set of attributes of the message consumer devices.

21. The application server of claim 15, wherein the centroid, of each cluster of the one or more clusters, is determined based on a mean of the second semantic weight associated with the set of attributes of the message consumer devices.

* * * * *